O. M. SPILLER,
Assignor, by mesne assignments, to H. C. GOODELL,
Non-Conducting Fillings for Dinner Pails, Safes, and other Receptacles.
No. 9,483. Reissued Nov. 30, 1880.
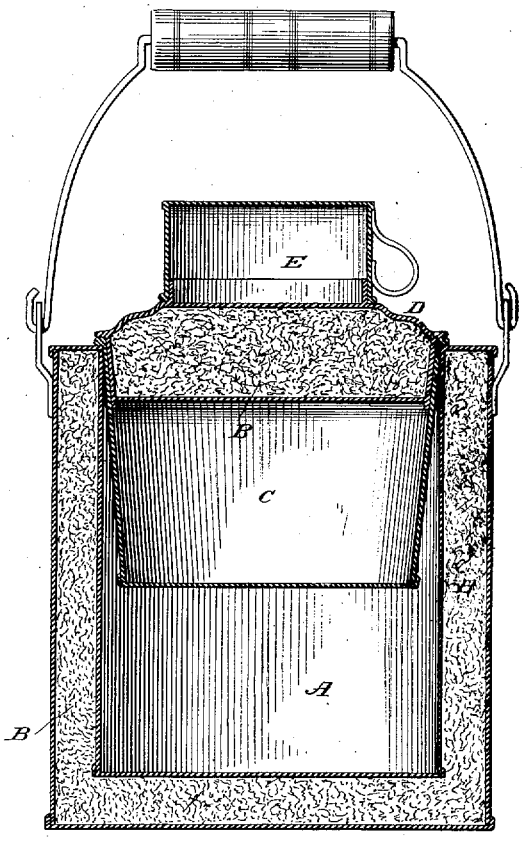
Attest:
R. F. Barnes.
L. W. Serrell
Inventor:
Oscar M. Spiller
by Elis Spear
Attorney

UNITED STATES PATENT OFFICE.

OSCAR M. SPILLER, OF HOBOKEN, NEW JERSEY, ASSIGNOR, BY MESNE ASSIGNMENTS, TO HENRY C. GOODELL.

NON-CONDUCTING FILLING FOR DINNER-PAILS, SAFES, AND OTHER RECEPTACLES.

SPECIFICATION forming part of Reissued Letters Patent No. 9,483, dated November 30, 1880.

Original No. 144,232, dated November 4, 1873. Application for reissue filed July 19, 1880.

*To all whom it may concern:*

Be it known that I, OSCAR M. SPILLER, of Hoboken, in the county of Hudson and State of New Jersey, have invented an Improved Non-Conducting Filling for Dinner-Pails, Safes, and other Receptacles, to be placed between the double walls to be protected, and applicable to any receptacle the walls of which are required to be impervious to heat, of which the following is a specification.

My invention consists of lamp-black, either with or without an admixture of hair, as a non-conducting filling for pails, pitchers, refrigerators, and like vessels in which articles of food or drink are to be kept at a temperature differing from that of the surrounding atmosphere, or as a filling for the walls of iron fire-proof safes.

Heretofore charcoal as well as many other well-known substances have been used for this purpose; but I have found that lamp-black, whether used alone or with a small admixture of hair, has superior qualities as a non-conductor, and possesses certain advantages arising out of its lightness and resistance to any influences of moisture.

As suggested, it may be used alone or with a packing of hair or any other suitable fibrous or porous material.

The non-conducting material is to be packed in the space between the walls, on all sides, in the same manner as such non-conducting fillings are ordinarily applied.

I have illustrated a practical application of my invention in the accompanying drawing, which represents a pail adapted to contain articles of food, and to keep them warm for a considerable time.

In this drawing, A represents the body of the pail, which consists of two casings, between which is placed a filling of lamp-black, B, and, if deemed desirable, there may be mixed with it a suitable quantity of hair or woolen fiber.

The other compartments of the pail are constructed in the usual manner, consisting of a bowl C, having a cover, D, on the top of which is attached a drinking-cup, E.

In experiments with this pail it was found to preserve the contents as hot as desirable after being placed in a refrigerator for six hours.

Having thus described my invention, what I claim as new, and desire to secure, is—

1. A vessel or receptacle having double walls, the spaces between said walls being filled with lamp-black, whereby the passage of heat through said walls is prevented.

2. As a non-conducting filling for the double walls of receptacles, lamp-black, applied to said walls in the manner described.

3. In combination with lamp-black as a non-conducting filling to be placed between the double walls of receptacle, an admixture of hair or other fibrous material, as set forth.

In testimony thereof I have hereunto set my hand to this specification in the presence of two subscribing witnesses.

OSCAR M. SPILLER.

Witnesses:

JOSEPH H. ALLEN,

THOS. MCLEAN.